United States Patent
Trim et al.

(10) Patent No.: US 10,958,758 B1
(45) Date of Patent: Mar. 23, 2021

(54) USING DATA ANALYTICS FOR CONSUMER-FOCUSED AUTONOMOUS DATA DELIVERY IN TELECOMMUNICATIONS NETWORKS

(71) Applicant: International Business Machines Corporation, Armonk, NY (US)

(72) Inventors: Craig M. Trim, Ventura, CA (US); Kimberly Greene Starks, Nashivlle, TN (US); Michael Edward Alexander, Great Falls, VA (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/692,405

(22) Filed: Nov. 22, 2019

(51) Int. Cl.
*H04L 29/08* (2006.01)
*H04W 24/08* (2009.01)
(Continued)

(52) U.S. Cl.
CPC ............ *H04L 67/325* (2013.01); *G06N 5/04* (2013.01); *H04L 67/18* (2013.01); *H04L 67/22* (2013.01);
(Continued)

(58) Field of Classification Search
None
See application file for complete search history.

(56) References Cited

U.S. PATENT DOCUMENTS 5,976,952 A * 11/1999 Gardner ............ H01L 21/76213
257/E21.556
8,438,291 B2   5/2013 Davis et al.
(Continued)

FOREIGN PATENT DOCUMENTS

WO   2016109131 A1   7/2016

OTHER PUBLICATIONS

"Content delivery network", Wikipedia, last edited on Nov. 14, 2019, 10 pages, <https://en.wikipedia.org/wiki/Content_delivery_network>.

(Continued)

*Primary Examiner* — Lashonda T Jacobs
(74) *Attorney, Agent, or Firm* — Michael A. Petrocelli

(57) ABSTRACT

The present disclosure uses data analytics for consumer focused autonomous data delivery in a 5G (fifth generation cellular network technology) telecommunications network. Data usage information is received at a control system, and the data usage information includes information about data downloaded by users at a venue. The data usage information includes content information about the data downloaded, the data being downloaded using a 5G telecommunications network. The data usage information is analyzed to determine content delivery using a service orchestration layer of a 5G telecommunications network in concert with smart channel monitoring tools of compatible platforms. A predictive analysis is generated using the analysis of the data usage information. A data action is initiated pertaining to the content for downloading the content, based on the predictive analysis, before demand for the downloading of the content, to provide faster service to end users at the venue.

20 Claims, 8 Drawing Sheets

(51) Int. Cl.
*G06N 5/04* (2006.01)
*H04W 4/021* (2018.01)
*G06F 16/487* (2019.01)

(52) U.S. Cl.
CPC ........ *H04L 67/2847* (2013.01); *H04L 67/306* (2013.01); *H04W 4/021* (2013.01); *H04W 24/08* (2013.01); *G06F 16/487* (2019.01)

(56) References Cited

U.S. PATENT DOCUMENTS

| | | | |
|---|---|---|---|
| 8,495,196 | B2 | 7/2013 | Harrang et al. |
| 8,615,549 | B2 | 12/2013 | Kwowles et al. |
| 8,892,780 | B2* | 11/2014 | Lee .......... G06F 3/061 |
| | | | 710/5 |
| 9,111,279 | B2* | 8/2015 | Benson ........... H04N 21/25891 |
| 9,326,189 | B2 | 4/2016 | Luna et al. |
| 9,769,248 | B1* | 9/2017 | Krishnan ............... H04L 43/00 |
| 10,212,761 | B2* | 2/2019 | Le .......... H04W 76/12 |
| 10,235,503 | B2 | 3/2019 | Bangole et al. |
| 10,237,329 | B1* | 3/2019 | Pillai ....... G06F 15/16 |
| 10,356,552 | B1* | 7/2019 | Anders ............... H04W 24/02 |
| 10,368,212 | B2 | 7/2019 | Kweon et al. |
| 10,540,388 | B1* | 1/2020 | Alexander .......... G06F 16/9537 |
| 10,587,985 | B2* | 3/2020 | Shaw .......... H04W 4/33 |
| 10,665,130 | B1* | 5/2020 | Dudekula ............. G08G 1/005 |
| 10,667,019 | B2* | 5/2020 | Pfeffer ............ H04N 21/64738 |
| 2003/0007464 | A1* | 1/2003 | Balani ................. H04W 4/021 |
| | | | 370/310 |
| 2008/0204225 | A1 | 8/2008 | Kitchen |
| 2013/0170819 | A1* | 7/2013 | Dykeman ............. H04N 5/782 |
| | | | 386/299 |
| 2016/0127457 | A1* | 5/2016 | Shaw ............ H04W 4/70 |
| | | | 709/204 |
| 2016/0170819 | A1* | 6/2016 | Zhou ............. G06F 11/0727 |
| | | | 714/54 |
| 2017/0019446 | A1 | 1/2017 | Son |
| 2017/0093982 | A1* | 3/2017 | Shaashua ............... H04W 4/70 |
| 2017/0150321 | A1 | 5/2017 | Ciecko |
| 2017/0286419 | A1 | 10/2017 | Tang et al. |
| 2017/0318325 | A1* | 11/2017 | Ortiz ................ H04N 21/2181 |
| 2018/0109489 | A1 | 4/2018 | Wein et al. |
| 2018/0310224 | A1* | 10/2018 | Hardee ................. H04W 40/20 |
| 2018/0352386 | A1* | 12/2018 | Gunasekara ....... H04B 17/3912 |
| 2019/0014470 | A1* | 1/2019 | Bischinger .......... H04L 63/0876 |
| 2019/0028560 | A1 | 1/2019 | Holland |
| 2019/0122178 | A1* | 4/2019 | Kempf ............. G06Q 10/08355 |
| 2019/0205329 | A1 | 7/2019 | Subramanian et al. |
| 2019/0251599 | A1 | 8/2019 | Megdal |
| 2019/0394718 | A1* | 12/2019 | Nimbavikar .......... H04W 28/16 |
| 2020/0051566 | A1* | 2/2020 | Shin ........................ G06F 3/167 |
| 2020/0051572 | A1* | 2/2020 | Sohn ....................... G10L 17/04 |
| 2020/0067906 | A1* | 2/2020 | Florez ................... H04L 63/105 |
| 2020/0128072 | A1* | 4/2020 | Trim ...................... G06N 20/00 |
| 2020/0169615 | A1* | 5/2020 | Trim .................... G06F 16/258 |
| 2020/0234385 | A1* | 7/2020 | Vanslette ............... G06Q 10/20 |
| 2020/0236516 | A1* | 7/2020 | Kato ................. H04M 15/8016 |
| 2020/0302313 | A1* | 9/2020 | Jeong ..................... G10L 15/22 |

OTHER PUBLICATIONS

"Watson Speech to Text—Overview", IBM Cloud, last printed Nov. 18, 2019, 4 pages, <https://www.ibm.com/cloud/watson-speech-to-text>.

Borcoci, Eugen, "Content Distribution in Wireless/5G Environments", InfoWare 2015 Conference Oct. 12, 2015, Malta, 87 pages.

Luan, et al., "Fog Computing: Focusing on Mobile Users at the Edge", arXiv:1502.01815v3 [cs.NI] Mar. 30, 2016, pp. 1-11.

Melber Leonie Franke; "IoT-Enhanced Entertainment: A New use Case for 5G Fixed Wireless Access", Degree Project in Computer Science and Engineering, KTH Stockholm Royal Institute of Technology, Sweden, 105 pages, May 31, 2016.

Mell et al., "The NIST Definition of Cloud Computing", National Institute of Standards and Technology, Special Publication 800-145, Sep. 2011, 7 pages.

Popeangă, Janina, "Real-Time Business Intelligence for the Utilities Industry", Database Systems Journal vol. III, No. Apr. 2012, pp. 15-24, <www.dbjournal.ro/archive/10/10_2.pdf>.

Sabella, et al., "Designing the 5G network infrastructure: a flexible and reconfigurable architecture based on context and content information", EURASIP Journal on Wireless Communications and Networking (2018), 16 pages, <https://doi.org/10.1186/s13638-018-1215-1>.

\* cited by examiner

US 10,958,758 B1

USING DATA ANALYTICS FOR CONSUMER-FOCUSED AUTONOMOUS DATA DELIVERY IN TELECOMMUNICATIONS NETWORKS

BACKGROUND

The present disclosure relates to consumer focused autonomous media delivery, using data analytics, for telecommunications networks, and more particularly, the present disclosure relates to delivering the media in 5G (fifth generation cellular network technology) telecommunications networks.

5G (fifth generation cellular network technology) refers to a system using "5G NR" (5G New Radio) software as "5G". 5G can be defined as telecommunications networks that meet the requirements of the ITU IMT-2020 (International Mobile Telecommunications-2020 (IMT-2020 Standard)). The requirements are issued by the (International Telecommunication Union) ITU Radiocommunication Sector (ITU-R) of the International Telecommunication Union (ITU) for 5G networks, devices and services.

Typical delivery systems do not consider a downloadable media type, demand situations and times, when delivering downloadable data. This can result in poor download speeds and connectivity issues. For example, media may not stream effectively or be interrupted resulting from poor connectivity and resulting in a poor viewing experience.

SUMMARY

The present disclosure recognizes the shortcomings and problems associated with current systems for delivering data in telecommunications networks, especially during times of peak demand and/or demand for certain types of media.

Media content for delivery to be watched by a plurality of people, can have the undesirable result of having poor TRP (multiple transmission and reception points or multi-TRPs). It would be desirable to have an automated delivery of media and a mechanism by which the 5G orchestration can identify the media type, viewing data, and can accordingly update the media delivery autonomously.

In embodiments according to the present invention, a method and system detects location or venue of a plurality of users and initiates a content delivery network to adjust and customize downloadable data and content according to expected demand and type of media to be delivered to the users at the location or venue.

In one aspect according to the present invention, a method for consumer focused autonomous data delivery in a 5G (fifth generation cellular network technology) telecommunications network. The method includes receiving data usage information at a control system, the data usage information including information about data downloaded by users at a venue, and the data usage information includes content information about the data downloaded, and the data is downloaded using a 5G telecommunications network. The method includes analyzing the data usage information to determine content delivery using a service orchestration layer of a 5G telecommunications network in concert with smart channel monitoring tools of compatible platforms. A predictive analysis is generated using the analysis of the data usage information, the predictive analysis including determining when the content is delivered and classification of content information about the content. A data action is initiated pertaining to the content for downloading the content, based on the predictive analysis, before demand for the downloading of the content, to provide faster service to end users at the venue. The method includes delivering the content to the end users at the venue in response to the downloading of the content by the end users.

In a related aspect according to the present invention, the data usage information includes bandwidth data related to a time of day at the venue.

In a related aspect according to the present invention, the smart channel monitoring tools are part of 4G technology.

In a related aspect according to the present invention, the data action includes preparing a downloading of data based on the predictive analysis.

In a related aspect according to the present invention, the data action includes preparing a downloading of data based on the predictive analysis, before the delivering of the data.

In a related aspect according to the present invention, the data action includes moving the content closer to a sourcing device, based on the predictive analysis, before the demand for the downloading of the content, to provide faster service.

In a related aspect according to the present invention, the data action includes notifying content delivery servers for delivering the content, based on the predictive analysis, before the demand for the downloading of the content, to provide faster service.

In a related aspect according to the present invention, the method further includes determining data usage patterns of end users at the venue as part of the predictive analysis, the determining of the data usage patterns including identifying a first data usage cluster; and in response to a predicted time for demand of the first data usage cluster, initiating a data action of first data pertaining to the first data usage cluster before the predicted time for demand of the first data pertaining to the first data usage cluster.

In a related aspect according to the present invention, the content delivery includes a media stream, and the data action includes notifying a content delivery server for delivering the content.

In a related aspect according to the present invention, the content includes a media stream of data.

In a related aspect according to the present invention, the content information includes one or more of, related metadata, and a stream delivery schedule.

In another aspect according to the present invention, a system for consumer focused autonomous data delivery in a 5G (fifth generation cellular network technology) telecommunications network includes a computer system comprising: a computer processor, a computer-readable storage medium, and program instructions stored on the computer-readable storage medium being executable by the processor, to cause the computer system to perform the following functions, by the computer system, comprising: receiving data usage information at a control system, the data usage information including information about data downloaded by users at a venue, the data usage information includes content information about the data downloaded, the data being downloaded using a 5G telecommunications network; analyzing the data usage information to determine content delivery using a service orchestration layer of a 5G telecommunications network in concert with smart channel monitoring tools of compatible platforms; generating a predictive analysis using the analysis of the data usage information, the predictive analysis including determining when the content is delivered and classification of content information about the content; initiating a data action pertaining to the content for downloading the content, based on the predictive analysis, before demand for the downloading of the content, to provide faster service to end users at the venue; and delivering the content to the end users at the venue in response to the downloading of the content by the end users.

In another aspect according to the present invention, a computer program product for consumer focused autonomous data delivery in a 5G (fifth generation cellular network technology) telecommunications network. The computer program product comprising a computer readable storage medium having program instructions embodied therewith, the program instructions executable by a computer to cause the computer to perform the following functions, by the computer, to: receive data usage information at a control system, the data usage information including information about data downloaded by users at a venue, the data usage information includes content information about the data downloaded, the data being downloaded using a 5G telecommunications network; analyze the data usage information to determine content delivery using a service orchestration layer of a 5G telecommunications network in concert with smart channel monitoring tools of compatible platforms; generate a predictive analysis using the analysis of the data usage information, the predictive analysis including determining when the content is delivered and classification of content information about the content; initiate a data action pertaining to the content for downloading the content, based on the predictive analysis, before demand for the downloading of the content, to provide faster service to end users at the venue; and deliver the content to the end users at the venue in response to the downloading of the content by the end users.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

5G (fifth generation cellular network technology) refers to any system using "5G NR" (5G New Radio) software as "5G". 5G can be defined as telecommunications networks that meet the requirements of the ITU IMT-2020 (International Mobile Telecommunications-2020 (IMT-2020 Standard)). The requirements are issued by the (International Telecommunication Union) ITU Radiocommunication Sector (ITU-R) of the International Telecommunication Union (ITU) for 5G networks, devices and services.

Advancements in the telecommunication industry has further enabled technologies including Artificial Intelligence (AI) provide further services. The 5G technology may serve to push dependent technologies to a higher level, that is, an upper stratum by parallelizing the physical channel, and thus higher bandwidth, through mobility bandwidth of 1 GBPS, Convergence of IoT device access etc.

Figure 1:
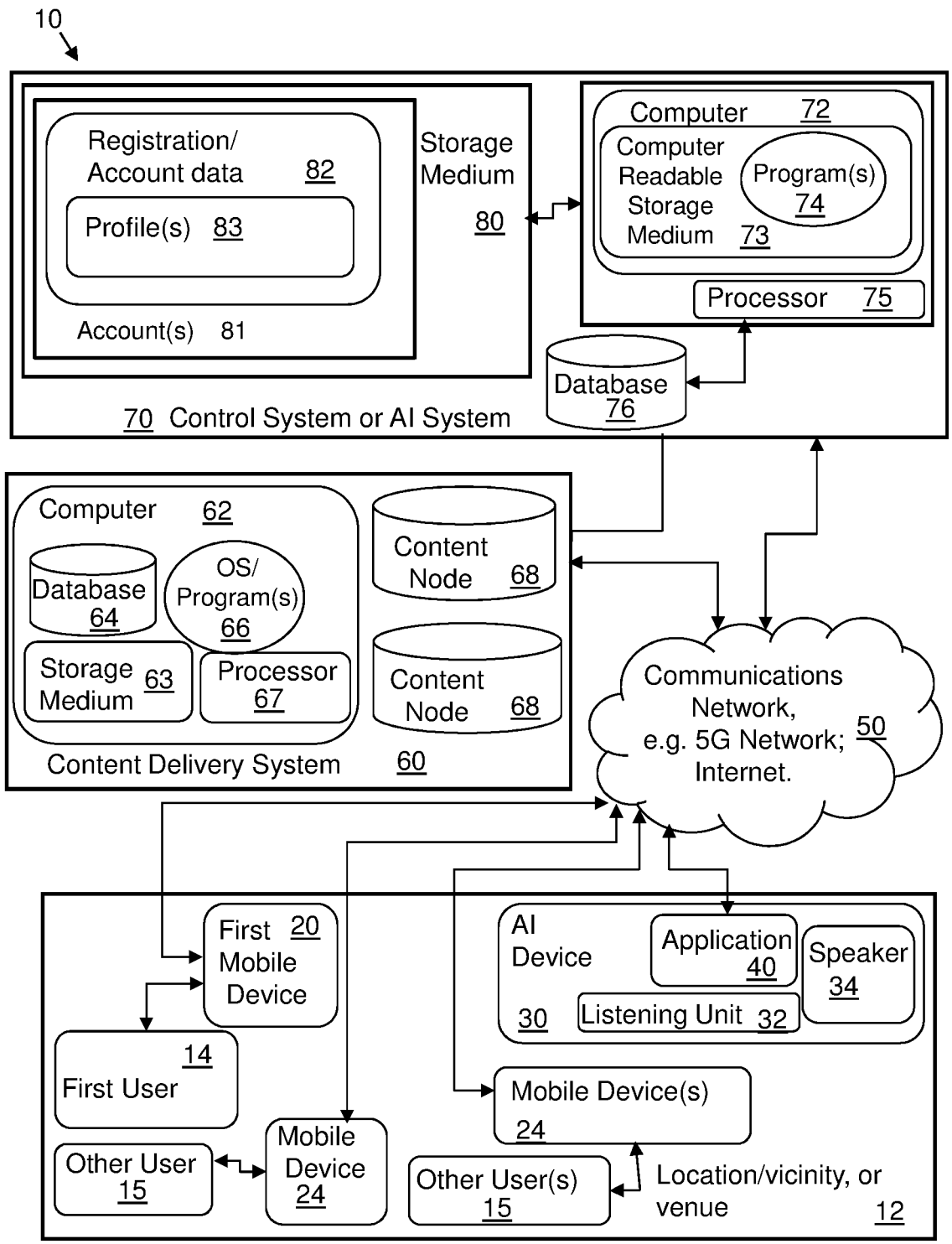
FIG. 1 is a schematic block diagram illustrating an overview of a system and methodology for consumer focused autonomous data delivery in a 5G (fifth generation cellular network technology) telecommunications network, according to an embodiment of the invention.
Figure 2:
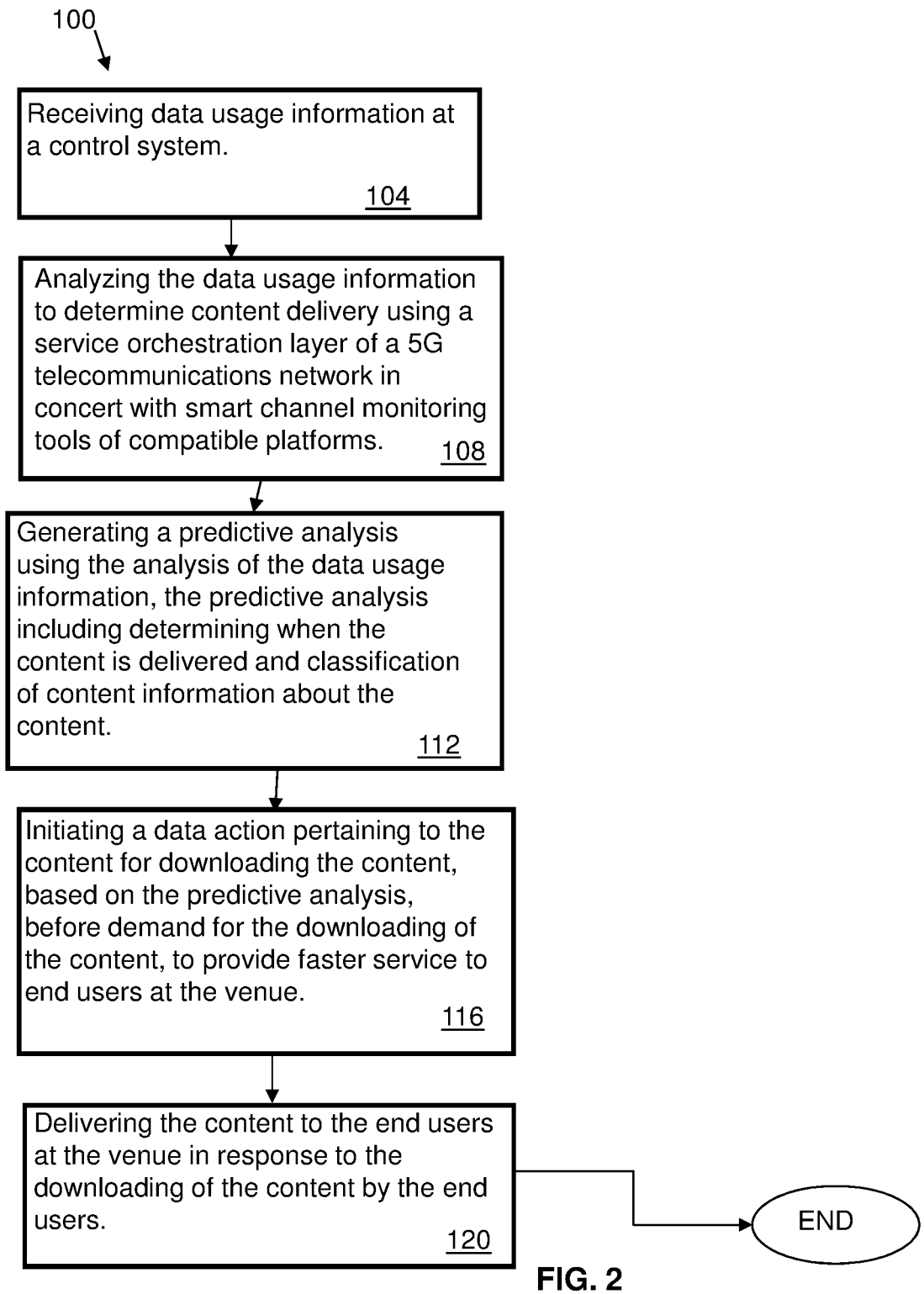
FIG. 2 is a flow chart illustrating a method, implemented using the system shown in FIG. 1, for consumer focused autonomous data delivery in a 5G (fifth generation cellular network technology) telecommunications network, according to an embodiment of the present invention.
Figure 3:
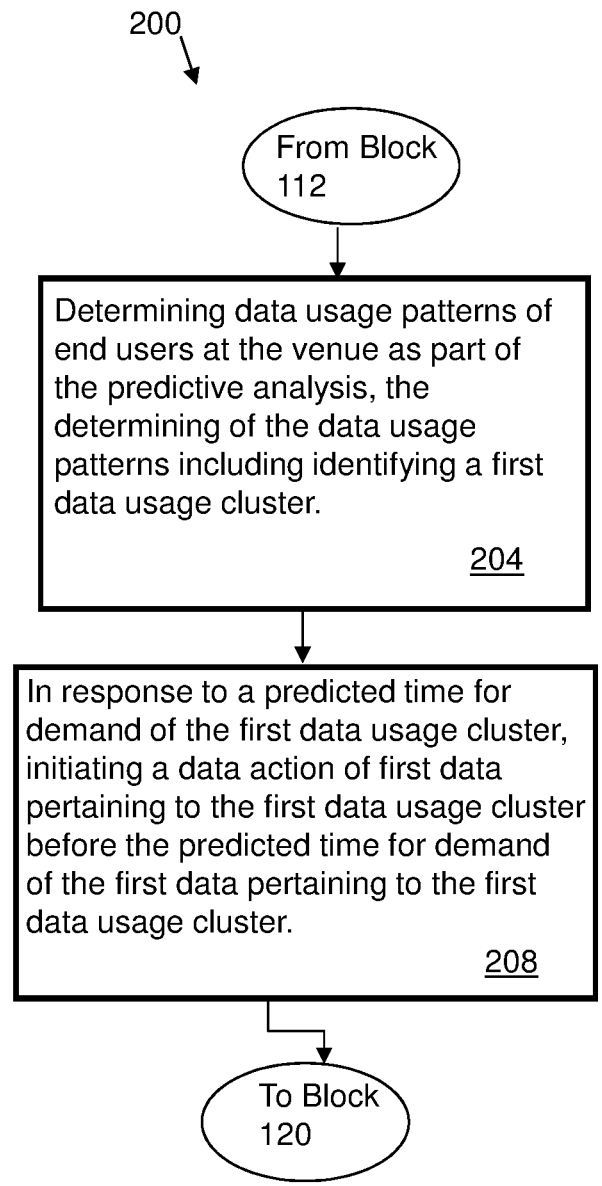
FIG. 3 is a flow chart illustrating another method, according to another embodiment of the invention, which proceeds from the method shown in FIG. 1, for consumer focused autonomous data delivery in a 5G (fifth generation cellular network technology) telecommunications network.

Referring to FIGS. 1 and 2, a method 100 (FIG. 2) with reference to a system 10 (FIG. 1) according to an embodiment of the present disclosure is provided for uses data analytics and artificial intelligence (AI) for consumer focused autonomous data delivery in a 5G (fifth generation cellular network technology) telecommunications network 50. Referring to FIG. 1, in one embodiment according to the present disclosure, an AI device 30, mounted or free standing, belonging to a first user communicates with a content delivery system or network 60. As shown in FIG. 1, an AI system can be at the location and assist in collecting data and communicating with the content delivery system and a control system 70 or AI system via a communications network 50, e.g., the 5G network. In another example, the control system can be part of an AI system, and in another example, the control system and the content delivery system can be, all or in part, integral with an AI system for delivering data resources to an end user. The AI device can be a home device which is on a desktop or a counter top device, or part of a mobile device which results in the location being a vicinity around the mobile device. The AI device can include a listening unit 32 such as a microphone, for receiving commands from a user, and also includes a speaker 34 for broadcast communications.

The AI device can be situated in a location or vicinity or venue 12, e.g., a user's home, which descriptions are used interchangeably and understood to refer to the same thing. Such a location can be, for example, a user's house having the AI device at a location in the house, for example, on a countertop or table. Another location can be a public location, such as a library or a retail establishment, for example, a coffee house or a book store. An AI system can operate on a specific or proprietary AI platform, wherein the platform enables the AI system and associated AI devices to communicate. In one embodiment, an AI device can be a mobile device which accesses an AI system, for example, via the 5G network, or in another example the Internet. In this example, the vicinity or location would be a location of the mobile device and the vicinity would be an area around the mobile device, such as the area within audible range of the device.

Also, referring to FIG. 1, the content delivery system 60 includes a computer 62, database 64, and operating systems and programs 66, and also a processor 67 and a storage medium, i.e., a computer readable storage medium 63. The content delivery system also includes content nodes 68 which can store content on computer readable storage media for delivery to one or more users.

In the present example, a first user 14 and other users 15 are shown for illustration, however, a multiplicity of other users can be at the location. Other user devices, other than a mobile device can include, for example, a computer, a laptop computer, or a desktop computer, or a tablet having a computer. In one example, a first user 14 can have a first mobile device 20. In another example, other users 15 can have associated mobile devices 24.

A control system is in communication with the AI device 30 and the content delivery system 60. In one example, the AI device 30 can include an application 40. The AI device 30 communicates with the content delivery system 60 and the control system 70 using a communications network 50 (e.g. the 5G network, and in another example the Internet).

Also, referring to FIG. 1, a user's electronic device, e.g., a mobile device 20 can include a computer, computer readable storage medium, and operating systems, and/or programs, and/or a software application. These features are shown generically herein in FIG. 5 referring to one or more computer systems 1010.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system via a communications network 50 (e.g., the 5G network, and in another example the Internet) and access data, and cooperate with program(s) stored on the remote computer system.

The first mobile device of the first user, and the other mobile devices of the other users are capable of downloading data, such as media data and streaming, and video. The mobile devices can be in communication with a control system 70 via the communications network 50. The control system 70 includes a computer 72 having a database 76 and one or more programs 74 stored on a computer readable storage medium 73. In the embodiment of the disclosure shown in FIG. 1, the mobile devices 20, 24 communicate with the control system 70 and the one or more programs 74 stored on a computer readable storage medium 73. The control system includes the computer 72 having a processor 75, and which also has access to the database 76.

The control system 70 includes a storage medium 80 for maintaining a registration 82 of users and their devices for collaboration with the content delivery system 60. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, the AI device 30, and can access data and additional programs at a back end of the application, e.g., control system 70.

In one embodiment of the present disclosure, the control system 70 includes a storage medium 80 for maintaining a registration and account data 82 of accounts 81. The registration and account data 82 can include associated profiles 83 of users. The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the AI device, as in the example shown in FIG. 1 of AI device 30 having the application 40. The application 40 is stored on the AI device 30 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on an AI device 30. It is envisioned that the control system 70 can not only store the profile of users, but in one embodiment, can interact with a website for viewing on a display of a device, using the 5G network, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding any collection of data with respect to the present disclosure, such uploading or generation of profiles is voluntary by the one or more users, and thus initiated by and with the approval of a user. Thereby, a user can opt-in to establishing an account 81 having a profile 83 according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, the AI device 30 is associated with an AI system, which can be all or in part, the content delivery system 60, and be remote from the AI device 30. Such an AI system can be represented by one or more servers storing programs on computer readable medium which can communicate with one or more AI devices. The AI system can communicate with the control system, and in one or more embodiments, the control system can be all or part of the AI system or vice versa.

An Embodiment According to the Present Disclosure

Referring to FIG. 2, a computer-implemented method is disclosed for consumer focused autonomous data delivery in a 5G (fifth generation cellular network technology) telecommunications network 50.

Figure 4:
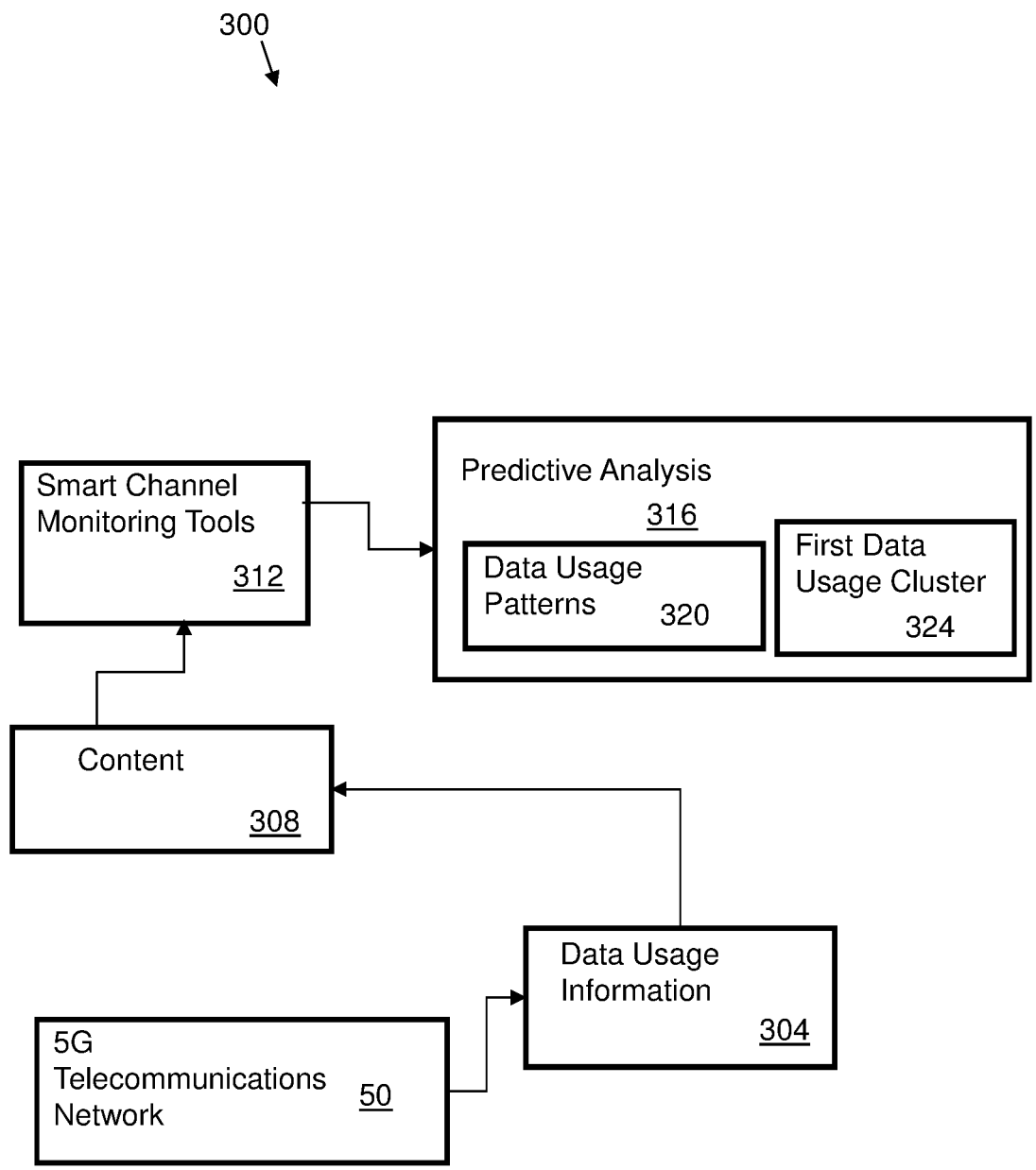
FIG. 4 is a functional block diagram for instructional purposes illustrating features of the present invention in association with the embodiments shown in FIGS. 1, 2, and 3, for consumer focused autonomous data delivery in a 5G (fifth generation cellular network technology) telecommunications network, according to embodiments of the invention.

It is understood that the features shown in FIG. 4 are functional representations of features of the present disclosure. Such features are shown in the embodiment 300 of the system and method of the present disclosure for illustrative purposes to clarify the functionality of features of the present disclosure.

It is understood that as discussed herein, a download or downloadable data can be initiated using a voice command or using a mouse, touch screen, etc. In such examples a mobile device can be user or an AI device can be used with consent and permission of users. Other examples of AI devices include devices which include a microphone, speaker, and can access a 5G network or the Internet, for example, a vehicle having a computer and having cellular or satellite communications, or in another example, IoT (Internet of Things) devices such as appliances having 5G, or Internet access.

The method 100, using the system 10, includes receiving data usage information 304 (see FIG. 4) at a control system 70, as in block 104. The data usage information includes information about data downloaded by users at a location or venue 12. The location or venue can be, for example, but not limited to, a user's home, or a social gathering venue, or a retail establishment. The data usage information includes content information about the data downloaded, and the data downloaded is downloaded using a 5G telecommunications network 50. The data usage information can include bandwidth data related to a time of day at the venue.

The method includes analyzing the data usage information to determine content delivery using a service orchestration layer of a 5G telecommunications network in concert with smart channel monitoring tools of compatible platforms, as in block 108. The smart channel monitoring tools 312 can be part of 4G technology.

The method includes generating a predictive analysis 316 using the analysis of the data usage information, the predictive analysis including determining when the content 308 is delivered and classification of content information about the content, as in block 112.

The method includes initiating a data action pertaining to the content for downloading the content, based on the predictive analysis, before demand for the downloading of the content, to provide faster service to end users at the venue, as in block 116. The data action can include preparing a downloading of data based on the predictive analysis 316. In another example, the data action can include preparing a downloading of data based on the predictive analysis, before the delivering of the data. In another example, the data action can include moving the content closer to a sourcing device, such as content devices 68, based on the predictive analysis, before the demand for the downloading of the content, to provide faster service. In another example, the data action can include notifying content delivery servers for delivering the content, based on the predictive analysis, before the demand for the downloading of the content, to provide faster service.

The method includes delivering the content to the end users at the venue in response to the downloading of the content by the end users, as in block 120.

In another embodiment according to the present disclosure, a method 200 proceeds from the method 100 shown in FIG. 1, continuing from block 112, the method 200 includes determining data usage patterns 320 of end users at the venue as part of the predictive analysis 316, the determining of the data usage patterns includes identifying a first data usage cluster 324, as in block 204.

The method 200 includes, in response to a predicted time for demand of the first data usage cluster, initiating a data action of first data pertaining to the first data usage cluster before the predicted time for demand of the first data pertaining to the first data usage cluster, as in block 208. The method 200 then continues to block 120 of FIG. 2.

In one example, the content delivery can include a media stream of data, and the data action can includes notifying a content delivery server for delivering the content. The content information can include one or more of, related metadata, and a stream delivery schedule.

In one example, the methods and systems according to the present disclosure can determine an anticipated contents and download requirements for a home use, when the user has scheduled a gathering of people. In one example, an AI device and system belonging to the user can assist in scheduling and informing the control system of a planned date and number of people for the gathering. The content delivery system can be prepared to delivery resources for use at the venue for the end users.

In another example, the methods and systems according to the present disclosure can determine an anticipated contents and download requirements for a commercial establishment, frequented by users after school or work, and where users typically connect to the Internet or use 5G services for downloading, viewing media, streaming video, etc. The control system, and/or an AI system as in the above example, can assist in scheduling and informing the content delivery system of dates and times of use or peak use, and the content delivery system can be prepared to delivery resources for use at the venue for the end users.

Thereby in the present disclosure, the systems and methods determine and can infer the state and/or anticipated download data demand for users at a location, and can initiate a content delivery system or network to tune the contents accordingly considering expected TRP, and type of media for delivery to an end user—location/venue.

Another Embodiment and Examples

According to one embodiment of the method and system of the present disclosure a method and system can work in the service orchestration layer of a 5G telecommunications network along with co-existing smart channel monitoring tools and with existing 4G and compatible platforms to identify the content delivered by media channels. The method and system can convert the content to textual format for processing, analyzes contents delivered to determine information insights, and can detect demand for downloadable data, for example, a number of people intended to watch contents delivered, a best time for delivery, by considering the anticipated download requirements. Such requirements can include a type of venue, time zones, local culture, environment, and the method and system can autonomously deliver the contents to the channels based on the anticipated download requirements. The method and system can communicate with the content delivery system to provide and to schedule-reschedule content for delivery based on the analysis, and can move the contents, at suitable times, intelligently, that is before the demand in anticipation of the demand. Thereby the method and system can collect information related to anticipated demand of data and can schedule media accordingly to meet expected TRP. The method and system according to the present disclosure can collect media metadata and current schedules from a content delivery system/network, analyzes metadata for delivery requirements, for example, TRP.

The method and systems according to the present disclosure can also collect external information to better target one or more a consumers. External information can include weather data along with other social information for better targeting and prepares a consumer profile type that can better target and determine contents to be downloaded or on demand based on a time of day, or other factors, and adjust the data offers based on repeated selection/rejection. The method and system communicates with the content nodes 68 of the content delivery system and fetches the media stream, related metadata, stream delivery schedule and analyses them and scheduled contents autonomously to the suitable predicted slots based on the time, situation, and nature of the contents, and notifies content delivery servers, for example the content nodes 68 to prepare for content demand. For example, the content delivery nodes can be servers, virtual servers, other computer readable storage media, as well as cloud based storage and delivery.

Other Embodiments and Examples

According to one embodiment of the method and system of the present disclosure a method and system can include a GUI (graphical user interface) based interface termed an AI based autonomous media delivery system (AIAMDS) (for example, the AIAMDS can be all or part of the control system and the content delivery system shown in FIG. 1) with the following capabilities.

The AIAMDS can leverage a broadcast channel's audio feed from the real-time media capture end to its framework. The converted speech to text can be sent to the hierarchical or parallel classifier along with the in-scope boundary definition (for example: news valid for local state, municipal or country). The AIMSA's boundary sensitive Natural Language classification module can be trained for topics.

An AIAMDS controller, for example the control system, can capture a 3D location (for example, leveraging existing techniques of trilateration to identify the elevation) of a 5G mobile device and an attached IoT tracker and can determine the locations and activities performed, and can select content accordingly.

The method and system includes detecting a status, for example, indoor, outdoor, indoor-busy, and can schedule the media delivery contents accordingly. For example, a festival can be detected by AIAMDS and people are detected as performing at a particular day and time. Then the AIAMDS can schedule filler contents (for example, old movies or songs) during this time and a popular movie can be rescheduled for another time frame.

The AIAMDS can predict the possibility of people watching the a data stream based on the characteristics defined, and can schedules content autonomously. The AIAMDS can also collect data on a local culture, media effects based on metadata classification and predict for suitable timelines for a selected content delivery. The AIAMDS can assimilate with a smart home AI system, weather information, and can in one example, provide a prediction for personality insights to make a determination of a possible mood of a person, based on natural language processing, and ability to classify media contents based on the data collected. The AIAMDS can monitor the cycle of an event and advise the service provider to switch back to a normal or previous or pre-event content delivery, or in an autonomous mode, auto switch to acceptable content for the defined boundaries. The AIAMDS can integrate and utilize expression maps, phrases used, gestures, and analyze conversions of input media streams, to shape the type of content and generate metadata accordingly.

One example advantage of the methods and systems of the present disclosure includes enabling IaaS/PaaS service providers (Software as a Service (SaaS), Platform as a Service (PaaS), and Infrastructure as a Service (IaaS)) to provide more accurate and optimal real-time data placement using 5G service orchestration. The method and system can also provide the ability to push the data based on a realistic situation by self-adjusting the monitoring levels based on real-time information utilization, etc. The methods and systems of the present disclosure enables providing more efficient monitoring of resources, thus helping to reduce non-related content and provide ability to dynamically manage selective media delivery.

According to an embodiment of the methods and systems of the present disclosure the content delivery system/network can include several servers which are responsible to provide the contents to end users when a requested 5G network is connected to a delivery network via a media gateway which interlinks the content delivery system/network and the 5G network in order to reach the end user. The system can include a real-time network where the data gets captured from news reads and other channels which are delivered to the end user's devices, or can be a part of a service orchestration layer based on the implementation.

The method and system can communicate with a content delivery server and fetch al media stream, where the contents are waiting for delivery, along with the delivery metadata which describes characteristics of the media contents. Upon reception of the stream and metadata, the stream can be converted to textual format using a conversion mechanism of voice to text conversion and an AI based system using classification, and training mechanisms to extract the entities, recognize possible emotional states and map them with local rules, local culture, expected TRP, user location as indoor or outdoor, people set, etc. The method and system can schedule delivery based on the expectation of the contents in order to make better alignment of content to be delivered on stream.

The method and system can use a policy engine to map an AI engine's information with the local culture along with several other parameters defined in the present disclosure and activates initiating service providers to schedule media contents.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
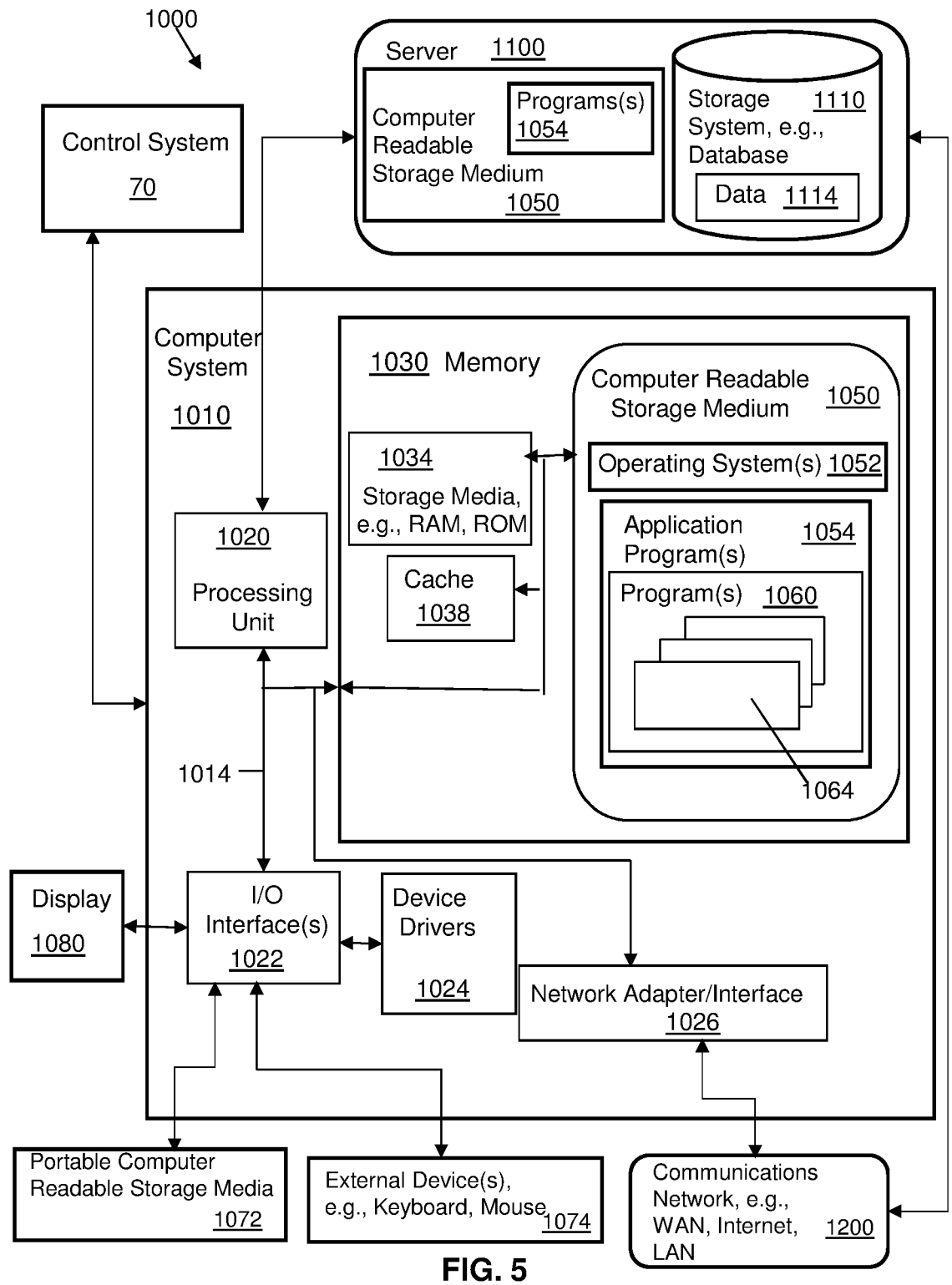
FIG. 5 is a schematic block diagram depicting a computer system according to an embodiment of the disclosure which may be incorporated, all or in part, in one or more computers or devices shown in FIG. 1, and cooperates with the systems and methods shown in FIGS. 1, 2 and 3.

Referring to FIG. 5, a system or computer environment 1000 includes a computer system 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components as a remote computer system, to achieve the control system functions described in the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 6:
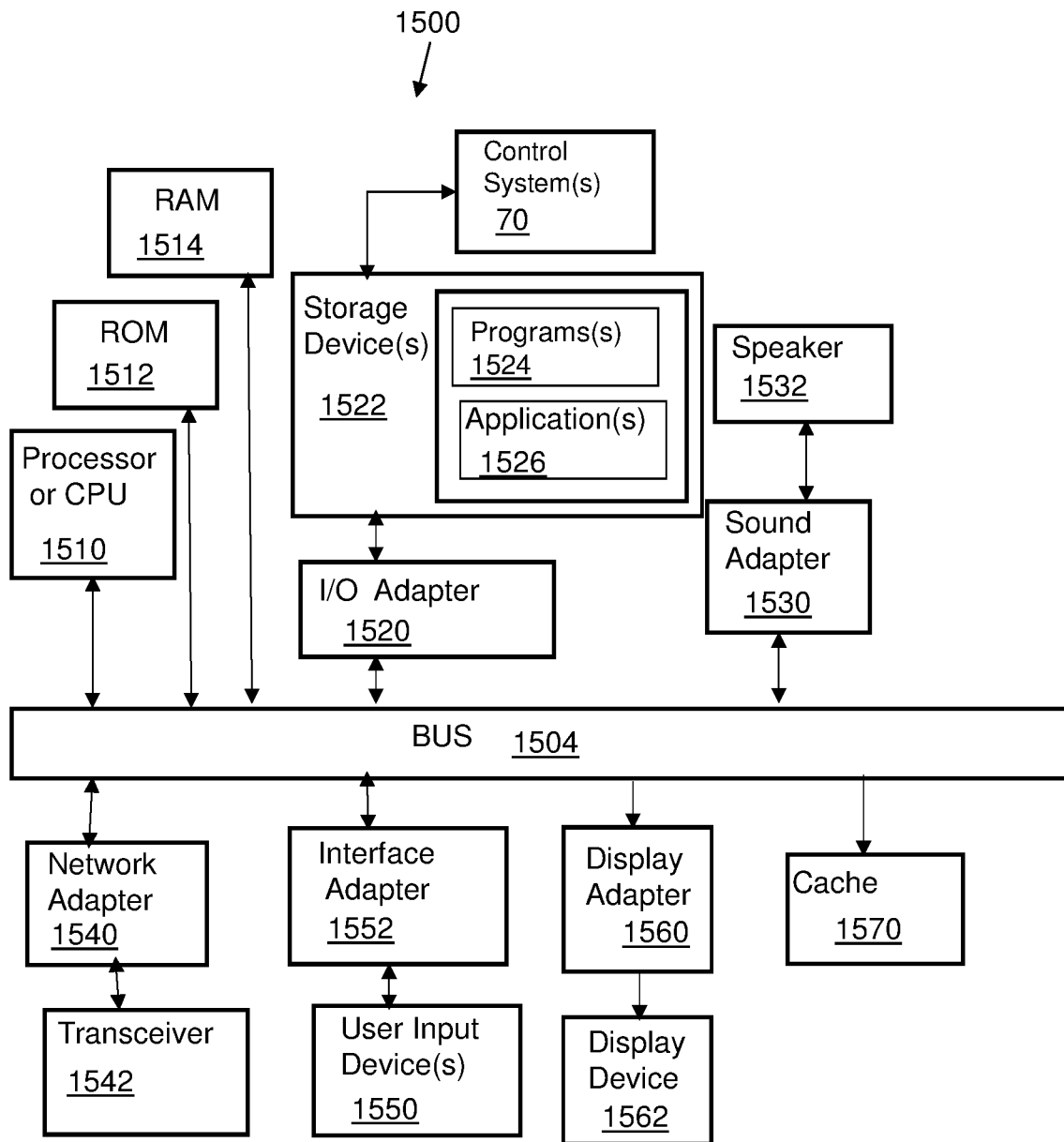
FIG. 6 is a schematic block diagram of a system depicting system components interconnected using a bus. The components for use, in all or in part, with the embodiments of the present disclosure, in accordance with one embodiment of the present disclosure.

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
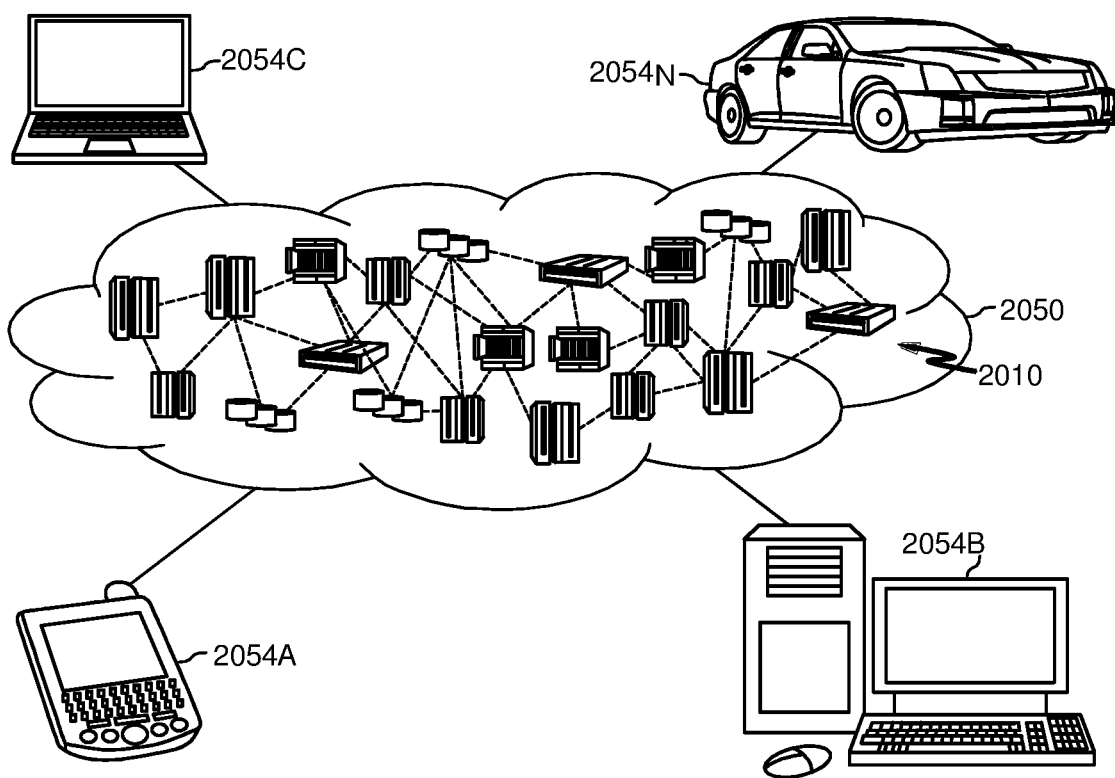
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
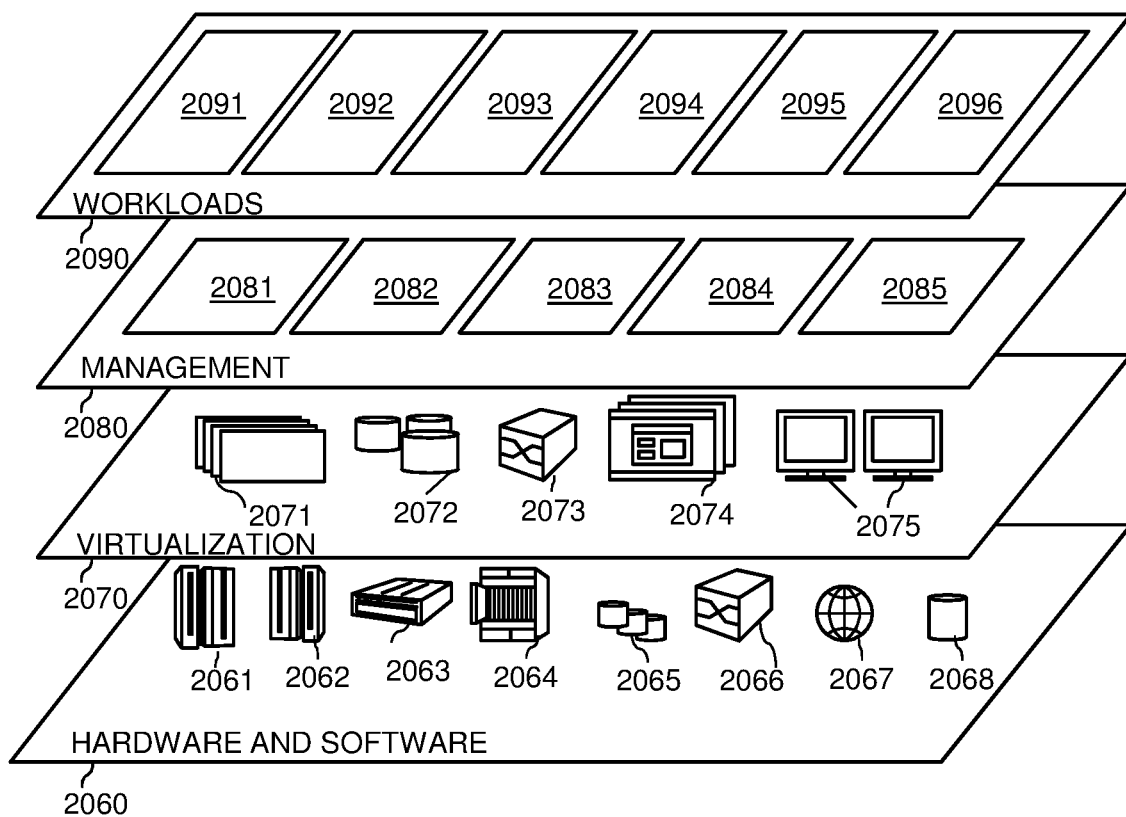
FIG. 8 is a block diagram depicting abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and consumer focused autonomous data delivery in a 5G (fifth generation cellular network technology) telecommunications network 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method using data analytics for consumer focused autonomous data delivery in a 5G (fifth generation cellular network technology) telecommunications network, comprising:
   receiving data usage information at a control system, the data usage information including information about data downloaded by users at a venue, the data usage information includes content information about the data downloaded, the data being downloaded using a 5G telecommunications network;
   analyzing the data usage information to determine content delivery using a service orchestration layer of a 5G telecommunications network in concert with smart channel monitoring tools of compatible platforms;
   generating a predictive analysis using the analysis of the data usage information, the predictive analysis including determining when the content is delivered and classification of content information about the content;
   initiating a data action pertaining to the content for downloading the content, based on the predictive analysis, before demand for the downloading of the content, to provide faster service to end users at the venue; and
   delivering the content to the end users at the venue in response to the downloading of the content by the end users.

2. The method of claim 1, wherein the data usage information includes bandwidth data related to a time of day at the venue.

3. The method of claim 1, wherein the smart channel monitoring tools are part of 4G technology.

4. The method of claim 1, wherein the data action includes preparing a downloading of data based on the predictive analysis.

5. The method of claim 1, wherein the data action include preparing a downloading of data based on the predictive analysis, before the delivering of the data.

6. The method of claim 1, wherein the data action includes moving the content closer to a sourcing device, based on the predictive analysis, before the demand for the downloading of the content, to provide faster service.

7. The method of claim 1, wherein the data action includes notifying content delivery servers for delivering the content, based on the predictive analysis, before the demand for the downloading of the content, to provide faster service.

8. The method of claim 1, further comprising:
   determining data usage patterns of end users at the venue as part of the predictive analysis, the determining of the data usage patterns including identifying a first data usage cluster;
   in response to a predicted time for demand of the first data usage cluster, initiating a data action of first data pertaining to the first data usage cluster before the predicted time for demand of the first data pertaining to the first data usage cluster.

9. The method of claim 1, wherein the content delivery includes a media stream, and the data action includes notifying a content delivery server for delivering the content.

10. The method of claim 1, wherein the content includes a media stream of data.

11. The method of claim 1, wherein the content information includes one or more of, related metadata, and a stream delivery schedule.

12. A system for consumer focused autonomous data delivery in a 5G (fifth generation cellular network technology) telecommunications network, which comprises:
    a computer system including, a computer processor, a computer-readable storage medium, and program instructions stored on the computer-readable storage medium being executable by the processor, to cause the computer system to perform the following functions, by the computer system, comprising;
    receiving data usage information at a control system, the data usage information including information about data downloaded by users at a venue, the data usage information includes content information about the data downloaded, the data being downloaded using a 5G telecommunications network;
    analyzing the data usage information to determine content delivery using a service orchestration layer of a 5G telecommunications network in concert with smart channel monitoring tools of compatible platforms;
    generating a predictive analysis using the analysis of the data usage information, the predictive analysis including determining when the content is delivered and classification of content information about the content;
    initiating a data action pertaining to the content for downloading the content, based on the predictive analysis, before demand for the downloading of the content, to provide faster service to end users at the venue; and
    delivering the content to the end users at the venue in response to the downloading of the content by the end users.

13. The system of claim 12, wherein the data usage information includes bandwidth data related to a time of day at the venue.

14. The system of claim 12, wherein the smart channel monitoring tools are part of 4G technology.

15. The system of claim 12, wherein the data action includes preparing a downloading of data based on the predictive analysis.

16. The system of claim 12, wherein the data action include preparing a downloading of data based on the predictive analysis, before the delivering of the data.

17. The system of claim 12, wherein the data action includes moving the content closer to a sourcing device, based on the predictive analysis, before the demand for the downloading of the content, to provide faster service.

18. The system of claim 12, wherein the data action includes notifying content delivery servers for delivering the content, based on the predictive analysis, before the demand for the downloading of the content, to provide faster service.

19. The system of claim 12, further comprising:
    determining data usage patterns of end users at the venue as part of the predictive analysis, the determining of the data usage patterns including identifying a first data usage cluster;
    in response to a predicted time for demand of the first data usage cluster, initiating a data action of first data pertaining to the first data usage cluster before the predicted time for demand of the first data pertaining to the first data usage cluster.

20. A computer program product for consumer focused autonomous data delivery in a 5G (fifth generation cellular network technology) telecommunications network, the computer program product comprising a computer readable storage medium having program instructions embodied therewith, the program instructions executable by a computer to cause the computer to perform the following functions, by the computer, to:
    receive, by the computer, data usage information at a control system, the data usage information including information about data downloaded by users at a venue, the data usage information includes content information about the data downloaded, the data being downloaded using a 5G telecommunications network;
    analyze the data usage information to determine content delivery using a service orchestration layer of a 5G telecommunications network in concert with smart channel monitoring tools of compatible platforms;
    generate a predictive analysis using the analysis of the data usage information, the predictive analysis including determining when the content is delivered and classification of content information about the content;
    initiate a data action pertaining to the content for downloading the content, based on the predictive analysis, before demand for the downloading of the content, to provide faster service to end users at the venue; and
    deliver the content to the end users at the venue in response to the downloading of the content by the end users.

* * * * *